(12) United States Patent
Pruitt

(10) Patent No.: US 9,090,159 B2
(45) Date of Patent: Jul. 28, 2015

(54) VIBRATION DAMPENED ENGINE MOUNTED RADIATOR ASSEMBLY

(71) Applicant: Detroit Radiator Corporation, Romulus, MI (US)

(72) Inventor: John R. Pruitt, Riverview, MI (US)

(73) Assignee: Randall Industries, Inc., Romulus, MI (US)

( * ) Notice: Subject to any disclaimer, the term of this patent is extended or adjusted under 35 U.S.C. 154(b) by 102 days.

(21) Appl. No.: 14/081,418

(22) Filed: Nov. 15, 2013

(65) Prior Publication Data

US 2015/0136355 A1     May 21, 2015

(51) Int. Cl.
*B60K 11/04*     (2006.01)

(52) U.S. Cl.
CPC ...................................... *B60K 11/04* (2013.01)

(58) Field of Classification Search
CPC ....................................................... B60K 11/04
USPC ................... 180/68.1–68.5; 165/69, 149, 155
See application file for complete search history.

(56) References Cited

U.S. PATENT DOCUMENTS

| | | | |
|---|---|---|---|
| 4,763,723 A | 8/1988 | Granetzke | |
| 5,558,310 A | 9/1996 | Furuie et al. | |
| 5,975,197 A * | 11/1999 | Kado | 165/149 |
| 6,237,676 B1 | 5/2001 | Hasegawa et al. | |
| 6,357,521 B1 | 3/2002 | Sugimoto et al. | |
| 7,243,710 B2 | 7/2007 | Shinhama | |
| 7,243,751 B2 | 7/2007 | Shigematsu | |
| 7,703,730 B2 | 4/2010 | Best, Jr. et al. | |
| 8,210,299 B2 | 7/2012 | Streeter | |

* cited by examiner

*Primary Examiner* — John Walters
*Assistant Examiner* — James Triggs
(74) *Attorney, Agent, or Firm* — Bill C. Panagos; J. Scott Martin; Butzel Long, P.C.

(57) ABSTRACT

An engine mounted, vibration dampened radiator to dampen vibrations from an engine to the radiator is disclosed. The radiator core is contained within a shell having two opposed longitudinal members and two opposed transverse members to form a coolant jacket. The vehicle radiator has a support bracket assembly equipped with a longitudinal member having a length with opposing first and second ends, and a width to accommodate at least one side of a vehicle radiator assembly, and a bracket member attached at one end to the longitudinal member and adapted to overfit internal coolant tubes in the radiator. The bracket has a length with opposing first and second ends, and a width. The bracket is equipped with at least one aperture along the width complementary to at least one coolant tube to permit insertion of the bracket over the coolant tube such that the tube extends through said aperture.

7 Claims, 3 Drawing Sheets

VIBRATION DAMPENED ENGINE MOUNTED RADIATOR ASSEMBLY

TECHNICAL FIELD

Radiator assemblies for internal combustion engines are subjected to vibrational forces during operation of the engine. Oftentimes, the radiator is mounted to a static frame structure that is fixed in place, and connected to the engine by conduits that accommodate the circulation of coolant from the engine to the radiator and back again.

Due to ever increasing governmental mileage requirements and consumer demand, vehicles are constantly redesigned to provide increased mileage per gallon of fuel consumed. One way this may be accomplished is to eliminate structure, and hence weight, of the vehicle so that the vehicle is lighter and therefore may travel further on a gallon of fuel.

Recently, vehicles have been designed wherein the radiator is mounted directly to the engine, thereby eliminating the structural components in the vehicle compartment which used to be where the radiator is mounted. However, there have been issues with engine vibrations being transmitted to the radiator, resulting in less than optimal radiator service life.

There is a need for an engine mounted, vibration dampened radiator assembly that provides optimal radiator service life and does not adversely impact vehicle weight and vehicle mileage goals.

SUMMARY

In one embodiment, there is disclosed a radiator support bracket assembly for use with engine mounted radiators. The support bracket assembly may include a longitudinal member having a length with opposing first and second ends, and a width; said length and width of sufficient dimension to accommodate at least one side of a radiator assembly. The longitudinal member may include a mounting structure such as clamps or fittings or screws to attach to a vehicle engine compartment structural member to provide additional stability for dampening the vibrations caused during engine operation. A transverse bracket member may be provided which is adapted to overfit internal coolant tubes in the radiator. The bracket may be of a material that is compatible with radiator coolant and radiator tubes. The bracket has a length with opposing first and second ends, and a width and is equipped with at least one aperture along the width located complementary to at least one radiator tube to permit insertion of the transverse bracket over the radiator tube such that the tube extends through the aperture. The transverse bracket is affixed at its first end to the longitudinal member.

The transverse bracket member may be of any material compatible with engine coolant and the material of the radiator tubes. In one application the material of choice may be brass, but in other application, aluminum, composite material and plastics may be used.

In another embodiment, there is disclosed an engine mounted, vibration dampened radiator structure. The vibration dampened radiator structure may include a vehicle radiator having a core with coolant tubes, said core contained within a shell. The shell has two opposed longitudinal members and two opposed transverse members. Each one of the longitudinal members and transverse members has a length and a width sufficient to accommodate the radiator core and form a coolant jacket. One transverse member is equipped with an aperture to permit addition of coolant to the coolant jacket and the other transverse member is equipped with an aperture to accommodate a return conduit to accommodate circulation of coolant within the radiator of the engine. The assembly includes a vehicle radiator support bracket assembly equipped with a longitudinal member having a length with opposing first and second ends, and a width; each of the length and width of sufficient dimension to accommodate at least one side of a vehicle radiator assembly. The support bracket assembly includes a bracket member adapted to overfit internal coolant tubes in the vehicle radiator. The bracket is made of a material compatible with radiator coolant and said radiator tubes. The bracket has a length with opposing first and second ends, and a width, and is equipped with at least one aperture along its width located complementary to at least one radiator tube to permit insertion of the bracket over the radiator tube such that the tube extends through the aperture. The bracket is affixed at said first end to the longitudinal member.

DETAILED DESCRIPTION

Figure 1:
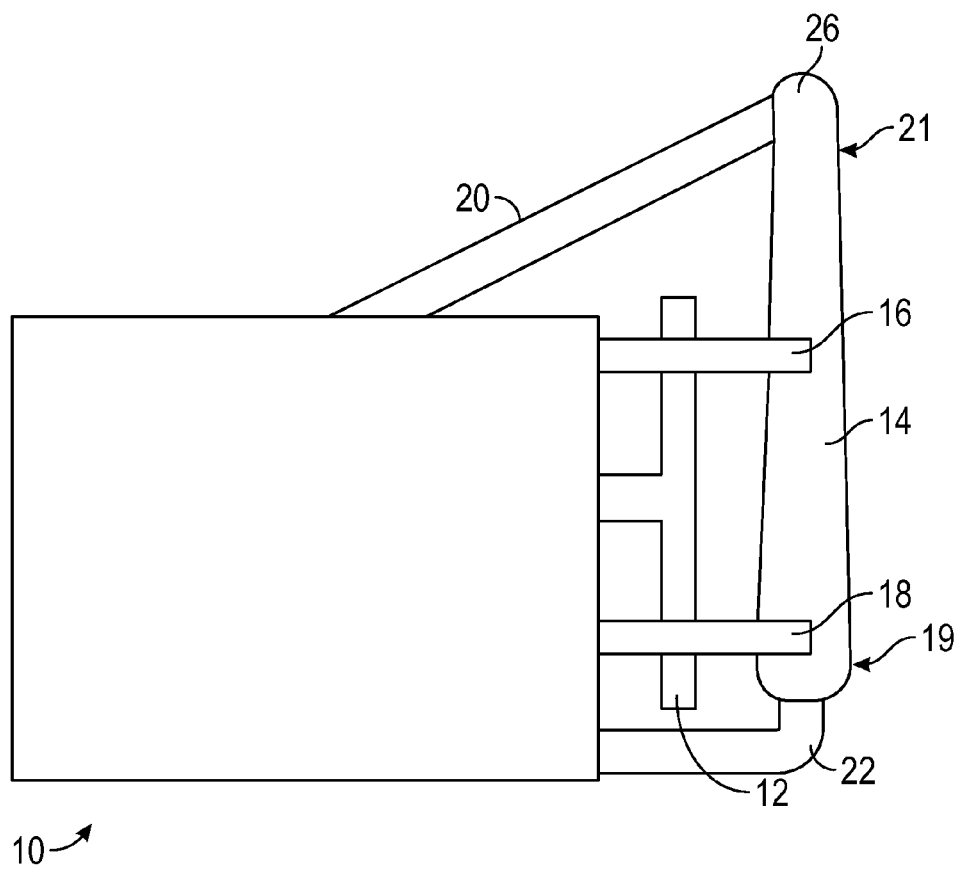
FIG. 1 is a schematic representation of a vehicle engine having a vibration dampened radiator assembly mounted thereto.

Turning now to the drawings wherein like numbers refer to like structures, there is shown an engine mounted radiator configuration that is exemplary and not limiting. Specifically, engine 10 has an engine fan 12 and radiator 14 mounted to it by braces 16 and 18 as shown FIG. 1. Conduits 20 and 22 are provided to accommodate coolant circulation in a manner well understood by those skilled in the art. The radiator 14 contains a core 56, which comprises coolant tubes 54. The core 56 is contained within a shell 19. The shell 19 comprises two opposed longitudinal members 26 and two opposed transverse members 25. The shell 19 and core 56 combine to form a coolant jacket 21. The coolant jacket 21 is comprised of longitudinal members 23 and transverse member 25.

Figure 2:
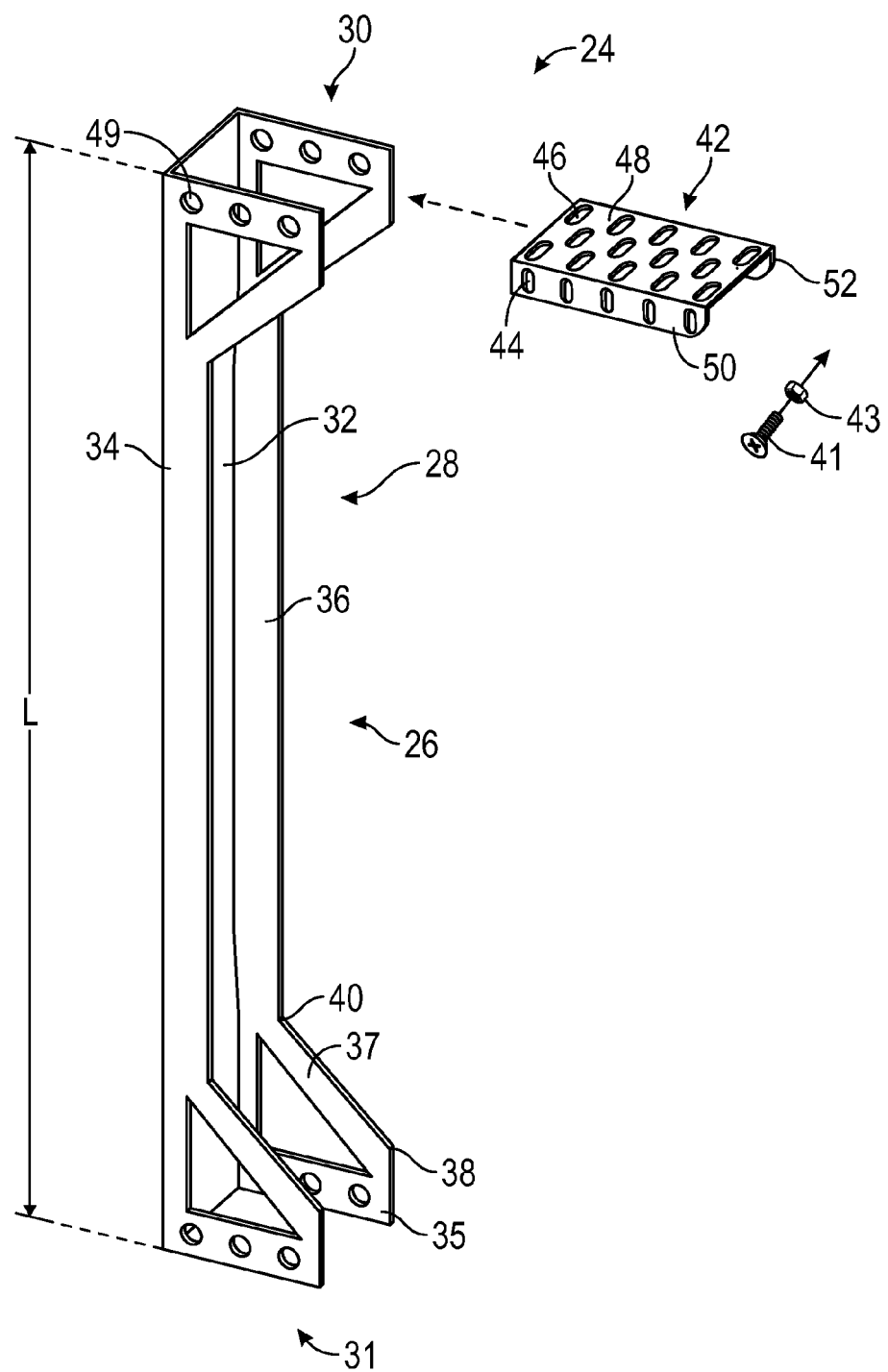
FIG. 2 is an exploded sectional view of one embodiment of the radiator support bracket assembly.

Turning to FIG. 2, there is shown an exploded view of one embodiment of the radiator support bracket assembly 24. Specifically, longitudinal member 26 has a body portion 28 having a length "L" terminating in opposing first and second ends 30 and 31.

The longitudinal member 26 may be constructed of a metal or other suitable material and has a longitudinal planar back 32, supporting two longitudinal opposed side members 34 and 36, each of which is substantially perpendicular to the longitudinal planar back 32. The width of the longitudinal planar back 32 is adapted to accommodate the width of a radiator 14, and may be of any size. Similarly, the longitudinal opposed side members 34 and 36 are dimensioned to facilitate a good fit between the longitudinal member 26 and the radiator core 56.

In the embodiment shown in FIG. 2, longitudinal member 26 is illustrated having its longitudinal opposed side members 34 and 36 terminating in transverse sections 35 at both the first and second end portions 30 and 31 of the longitudinal member 26. The transverse sections 35 are shown extending substantially perpendicular to the plane of the longitudinal planar back 32 of the longitudinal member 26. There is further provided a support strut 37 that extends from the end 38 of each transverse section 35 to a position 40 along the length of the longitudinal opposed side members 34 and 36 to lend structural stiffness to the transverse sections 35 and to each longitudinal member 26 as a whole.

A bracket member 42 is fixable to the longitudinal member 26 at the transverse sections 35 in any suitable manner. The bracket member 42 has a length and a width with a planar back 48 separating two opposed side members 50 and 52. As shown in this embodiment, each side member 50 and 52 is equipped with apertures 44 which are complementary to apertures 49 on the transverse sections 35. The apertures 44 are shown as oblong, such that the bracket member 42 is adjustable in a vertical direction for the length of the oblong apertures 44 to accommodate a more custom fit to the transverse sections 35 in a manner to be hereinafter described. In this manner, the bracket member 42 may be secured in place to the transverse sections 35 of the longitudinal member by nut 43 and bolt 41 assemblies, rivets or any other suitable manner to secure the bracket member 42 in place once the bracket member 42 is in the proper position relative to the radiator coolant tubes 54. The bracket member 42 is made of a material that is compatible with the coolant in the radiator 14 and the coolant tubes 54 so that galvanic corrosion is substantially reduced or eliminated. Suitable materials may include brass, aluminum, composite materials, plastics or any other material that is compatible with the coolant and the coolant tubes 54. The planar back 48 has at least one, and in some embodiments a plurality of apertures 46 configured to accommodate the shape of the coolant tubes 54 of the radiator's core 56.

Figure 3:
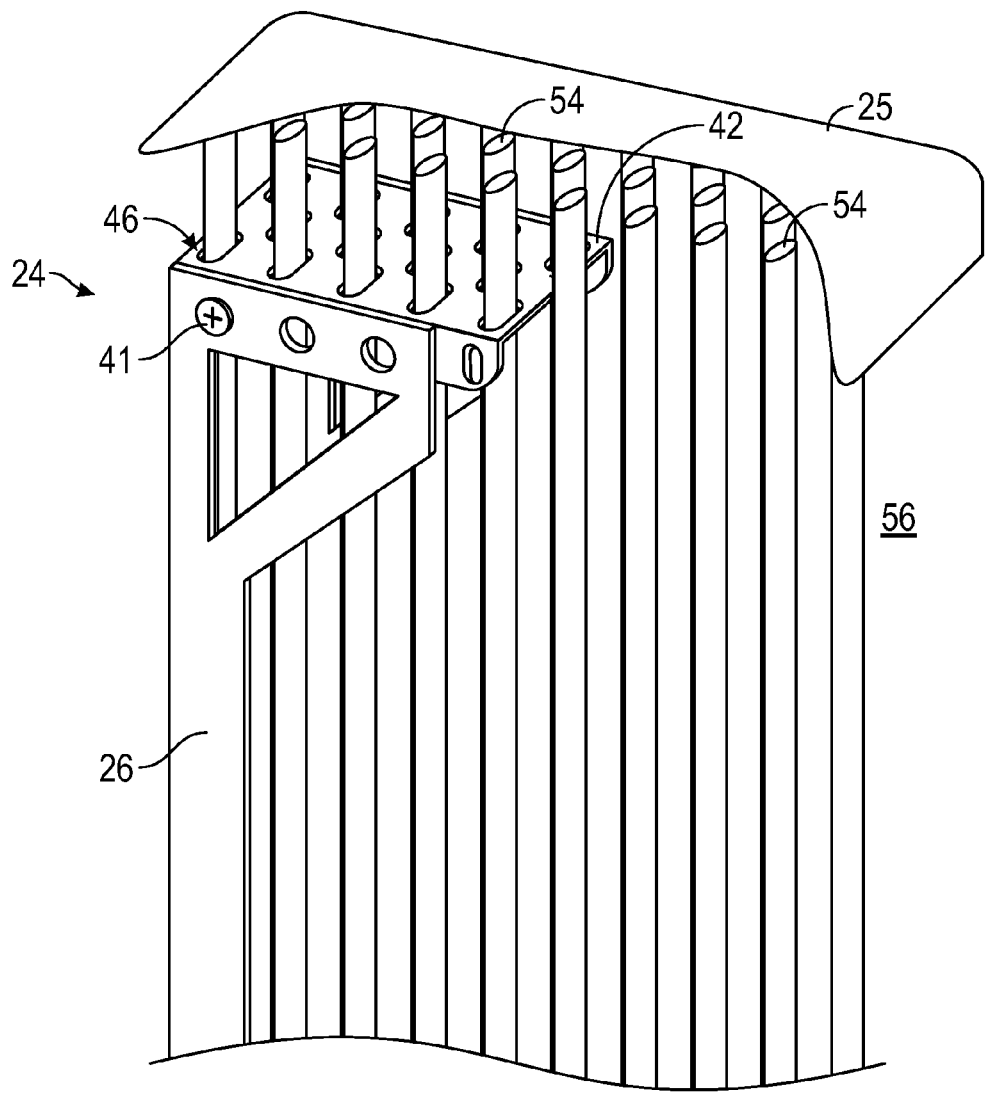
FIG. 3 is a detailed cut away view of the engine radiator assembly depicting the transverse bracket member's interaction with the radiator's coolant tubes in the vehicle radiator core.

In one mode of operation, the bracket member 42 is placed over the coolant tubes 54 and positioned along the radiator core 56 to a desired position. The longitudinal member 26 is then placed along the side of the radiator 14 and the bracket member 24 is fixed into the desired position as seen in FIG. 3. When the engine 10 is in operation, vibrations from the engine 10 will not be transmitted directly to the radiator core 56, but rather they are dampened by the described assembly, thereby reducing stresses and vibrations to the radiator core 56, and contributing to optimal service life for the radiator.

The words used herein are understood to be words of description and not words of limitation. While one embodiment has been described, it is apparent that many variations and modifications are possible without departing from the scope and sprit of the invention as set forth in the appended claims.

What is claimed as new and desired to be protected by Letters Patent of the United States is:

1. An engine mounted, vibration dampened radiator structure, comprising:

a vehicle radiator having a core with coolant tubes, said core contained within a shell, said shell having two opposed longitudinal members and two opposed transverse members; each of said longitudinal members and said transverse members having a length and a width sufficient to accommodate said core and form a coolant jacket; one transverse member equipped with an aperture to permit addition of coolant to the coolant jacket and said other transverse member equipped with an aperture to accommodate a return conduit to accommodate circulation of coolant within the radiator and said engine;

a vehicle radiator support bracket assembly, said support bracket assembly equipped with a longitudinal member having a length with opposing first and second ends, and a width; said length and width of sufficient dimension to accommodate at least one side of a vehicle radiator assembly, and;

a bracket member adapted to overfit internal coolant tubes in said vehicle radiator; said bracket of a material compatible with radiator coolant and said radiator tubes; said bracket having a length with opposing first and second ends, and a width, said bracket equipped with at least one aperture along the width located complementary to at least one said radiator tube to permit insertion of said bracket over said radiator tube such that the tube extends through said aperture; said bracket affixed at said first end to said longitudinal member.

2. The engine mounted, vibration dampened radiator assembly of claim 1, wherein the vehicle radiator support bracket assembly includes a plurality of apertures in said bracket member complementary with all the radiator tubes along the length of said bracket member.

3. The engine mounted vibration dampened radiator assembly of claim 1, wherein the vehicle radiator bracket member is comprised of brass.

4. The engine mounted vibration dampened radiator assembly of claim 1, further including a mounting structure on said longitudinal bracket member adapted to mount the radiator structure to a vehicle engine compartment structural component.

5. The engine mounted vibration dampened assembly of claim 1, wherein said vehicle is a heavy duty vehicle.

6. The engine mounted vibration dampened assembly of claim 1, wherein said vehicle is an off road construction vehicle.

7. The engine mounted vibration dampened assembly of claim 6, wherein said vehicle is a class 8 vehicle.

* * * * *